US009646571B1

(12) United States Patent
Côté et al.

(10) Patent No.: US 9,646,571 B1
(45) Date of Patent: May 9, 2017

(54) PANORAMIC VIDEO AUGMENTED REALITY

(71) Applicant: Bentley Systems, Incorporated, Exton, PA (US)

(72) Inventors: Stéphane Côté, Lac Beauport (CA); Marc Antoine Desbiens, Longueuil (CA)

(73) Assignee: Bentley Systems, Incorporated, Exton, PA (US)

( * ) Notice: Subject to any disclaimer, the term of this patent is extended or adjusted under 35 U.S.C. 154(b) by 996 days.

(21) Appl. No.: 13/909,690

(22) Filed: Jun. 4, 2013

(51) Int. Cl.
    *G09G 5/377* (2006.01)
    *H04N 5/232* (2006.01)

(52) U.S. Cl.
    CPC ... *G09G 5/377* (2013.01); *G05B 2219/39449* (2013.01); *G06T 2207/30244* (2013.01); *H04N 5/23238* (2013.01)

(58) Field of Classification Search
None
See application file for complete search history.

(56) References Cited

U.S. PATENT DOCUMENTS

| | | |
|---|---|---|
| 2002/0036649 A1 | 3/2002 | Kim et al. |
| 2007/0182812 A1 | 8/2007 | Ritchey |
| 2008/0024594 A1 | 1/2008 | Ritchey |
| 2009/0002394 A1 | 1/2009 | Chen et al. |
| 2012/0013988 A1 | 1/2012 | Hutchin |
| 2012/0300020 A1 | 11/2012 | Arth et al. |
| 2014/0270360 A1* | 9/2014 | Kim ............ G06T 7/2033 382/103 |

FOREIGN PATENT DOCUMENTS

WO    WO-2004036894 A2    4/2004

OTHER PUBLICATIONS

Wagner "Real-time Panoramic Mapping and Tracking on Mobile Phones", IEEE Virtual Reality, Mar. 20-24, 2010, Waltham, Mass., USA.*
Lemarie, Thomas, et al., "SLAM with Panoramic Vision," Journal of Field Robotics, vol. 24, No. 1-2, Feb. 13, 2007, pp. 1-30.
(Continued)

*Primary Examiner* — Maurice L McDowell, Jr.
(74) *Attorney, Agent, or Firm* — Cesari and McKenna, LLP; James A. Blanchette

(57) ABSTRACT

In one embodiment, an augmented view is provided utilizing a panorama. A panorama of the physical environment is captured with a panoramic camera. The panorama has a panoramic field of view and is embodied as a sequence of video frames. An initial pose of the panoramic camera is determined. The panoramic camera is tracked to update the initial pose to subsequent poses to account for movement of the panoramic camera about the physical environment. The tracking utilizes features dispersed across the panoramic field of view of video frames. The panorama is augmented by merging computer-generated elements with the panorama based on the updated pose of the panoramic camera. A sub-portion of the panorama, along with the computer-generated elements, is displayed as an augmented view. The displayed augmented view may have a field of view that is less than the panoramic field of view.

20 Claims, 4 Drawing Sheets

(56) References Cited

OTHER PUBLICATIONS

Arth, Clemens, et al., "Real-time Self-localization from Panoramic Images on Mobile Devices," Mixed and Augmented Reality (ISMAR), 2011 10th IEEE International Symposium on. IEEE, Oct. 26-19, 2011, pp. 1-10.

Giesler, Björn, et al., "Using a Panoramic Camera for 3D Head Tracking in an AR Environment," Proc. of Conf. IEEE Machine Vision and Mechatronics in Practice (M2VIP), 2002, pp. 1-11.

Klopschitz, Manfred, et al., "Visual Tracking for Augmented Reality," Indoor Positioning and Indoor Navigation (IPIN), 2010 International Conference on. IEEE, 2010, pp. 1-2.

Reitmayr, Gerhard, and Tom W. Drummond, "Going out: Robust Model-based Tracking for Outdoor Augmented Reality," Mixed and Augmented Reality, 2006, ISMAR 2006. IEEE/ACM International Symposium on. IEEE, 2006, pp. 1-10.

U.S. Appl. No. 13/364,846, filed Feb. 2, 2012 by Stéphane Côté et al. for a Technique for Providing an Initial Pose for a 3-D Model, pp. 1-35.

\* cited by examiner

PANORAMIC VIDEO AUGMENTED REALITY

BACKGROUND

Technical Field

The present disclosure relates generally to augmented reality, and more specifically, to augmented reality techniques that provide improved tracking of a camera's pose during an augmentation session.

Background Information

Augmented reality is a technology in which a view of a physical environment (i.e. a real-life environment) captured by a camera is merged with computer-generated graphics, text or other information (hereinafter "computer-generated elements"), such that the computer generated features appear as if they are part of the physical environment. The result of this merging is an augmented view. The augmented view may be static (e.g., a still image) or dynamic (e.g., a video). In contrast to virtual reality, where a simulated environment is shown to a user instead of the physical environment, augmented reality blends the virtual with the real to enhance a user's perception of the physical environment.

In order to create an augmented view, the position and orientation of the camera (hereinafter the camera's "pose") that captures the view of the physical is generally used to position and orientate a virtual camera within a computer-generated environment. It is then determined which portions of the computer-generated environment that are visible to the virtual camera. These portions are used to produce the computer-generated elements that are merged with the view of the physical environment, resulting in the augmented view.

In many cases, the camera capturing the view of the physical environment is not limited to a fixed position. The camera may have an initial pose, and subsequently may be moved about the physical environment by a user, taking on subsequent poses. In order to create an augmented view, the initial pose of the camera, and changes to the initial pose generally, need to be accurately determined. Operations to determine the camera's initial pose are generally referred to as "initialization", while operations for updating the initial pose to reflect movement of the physical camera are generally referred to as "tracking." A number of techniques have been developed to attempt to address challenges presented by initialization. Techniques have also been developed to attempt to address the challenged presented by tracking. However, the techniques suffer shortcomings.

Many tracking techniques rely upon detection of features in the view of the physical environment captured by the camera. The features may be lines, corners, or other salient details that can be reliably detected. A tracking algorithm may then be applied to these features. However, while a tracking algorithms may operate acceptably when there are a large number of detected features, reliability may decrease as the number of features decreases. Many cameras have very limited fields of view, limiting the portion of the physical environment they can see at a given moment in time. For example, many "standard" cameras have field of view of about 40° to 60° in a given orientation. If the portion of the physical environment visible within this field of view happens to have few features, a tracking algorithm may struggle to track the camera's pose, leading to an inaccurate and potentially jittery augmented view. For example, if a camera is directed towards a uniform white wall having no features, tracking may be lost. Further, if a substantial portion of the physical environment is occluded, for example by a person or object temporarily moving in front of the camera, tracking may be lost. Still further, even if a reasonable number of features are detected, they are typically grouped closely together, along one general orientation, which may hinder calculation of an accurate pose.

Accordingly, there are is a need for augmented reality techniques that provide improved tracking of a camera's pose during an augmentation session.

SUMMARY

In one embodiment, the shortcomings of the prior art are addressed by utilizing a panorama captured by a panoramic camera for tracking during an augmentation session. A panoramic camera has an extended field of view that increases the likelihood of capturing features usable by a tracking process and that is more resistant to occlusion, than a "standard" camera, having a more limited field of view. Further, the potential to capture features distributed in widely-separated orientations may increase accuracy of tracking. A sub-portion of the panorama, along with computer-generated elements, may be displayed on a display device to the user as an augmented view. The augmented view may have a field of view less than the panorama, the displayed field of view being akin to that captured by a "standard" camera.

An augmentation system may be logically divided into four processes: a capture process, an initialization process, a tracking process, and an augmentation process. The capture process captures the panorama utilizing the panoramic camera. The panorama may be composed of a sequence of video frames, and the capture process may operate continuously during the augmentation session to collect video frames as the panoramic camera is potentially moved about the physical environment. In addition to capturing the video frames, the capture process may also perform certain formatting and pre-processing operations upon the frames, to prepare them for use by other processes of the augmentation system.

The initialization process determines an initial pose of the panoramic camera. In one implementation, the initialization process provides an initialization user-interface via which a user explicitly indicates correspondence between certain features in the panorama and certain features in a 3-D model of the physical environment (i.e., the process being referred to herein as "manual" initialization). Alternatively, the initial pose may be determined "semi-manually" or fully "automatically" using other techniques, which do not require a user to explicitly indicate correspondence.

The tracking process operates to update the pose of the panoramic camera from the initial pose to subsequent poses, to account for movement of the panoramic camera about the physical environment. The tracking process may operate continuously during the augmentation session. The tracking process operates upon a plurality of features dispersed about the panorama. By utilizing features dispersed about the extended field of view, as opposed to a more narrow field of view captured by a "standard" camera", a sufficient number of features for reliable tracking may be available, even in adverse conditions. Further, due to the ability to utilize feature spread in widely-separated orientations, the accuracy of tracking may be increased, in comparison to techniques that rely upon features grouped more closely together. The tracking process may operate upon each sequential frame of the sequence of video frames captured by the panoramic camera. Alternatively the tracking process may operate upon a subset of the video frames, tracking periodically and/or in response to detected movement of the panoramic camera.

The augmentation process operates to merge computer-generated elements with the panorama based on the updated pose of the panoramic camera. The computer generated elements may be derived from the 3-D model of the physical environment (e.g., be elements of the 3-D model), or may be derived, at least in part, from another source. A sub-portion of the panorama, along with computer-generated elements, is displayed on a display device to the user as an augmented view. The augmented view may be embodied as a sequence of augmented video frames. The augmented view may have a field of view less than the panorama, akin to that captured by a "standard" camera, to facilitate display on the display device.

It should be understood that a variety of additional features and alternative embodiments may be implemented. This Summary is intended simply as an introduction to the reader, and does not indicate or imply that the examples mentioned herein cover all aspects of the invention, or are necessary or essential aspects of the invention.

BRIEF DESCRIPTION OF THE DRAWINGS

The detailed description below refers to the accompanying drawings of example embodiments, of which.

DETAILED DESCRIPTION

Figure 1:
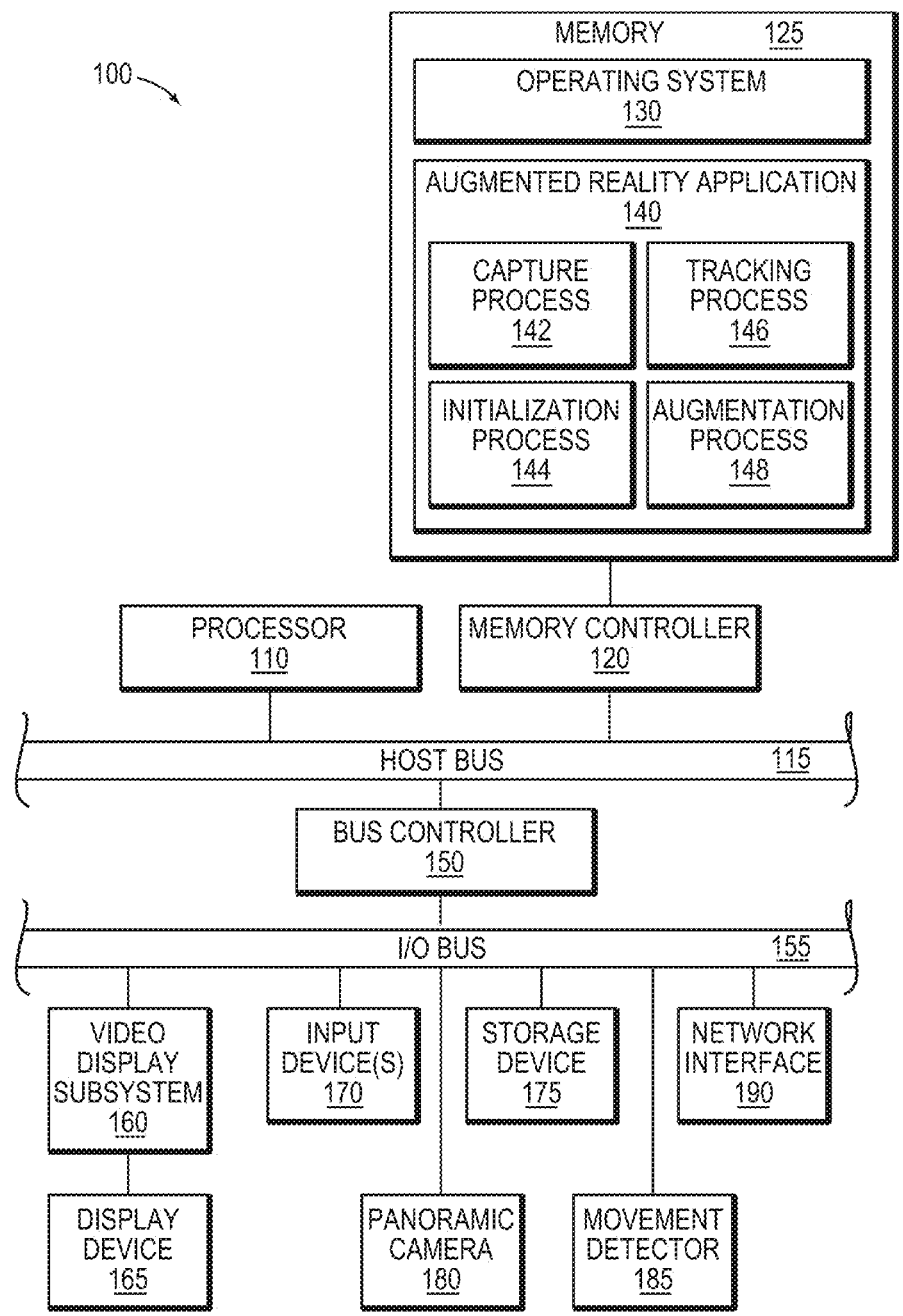
FIG. 1 is a block diagram of an example electronic device that may be used with the present techniques.

FIG. 1 is a block diagram of an example electronic device 100 that may be used with the present techniques. The electronic device 100 may be a portable electronic device (e.g., a notebook computer, a tablet computer, a Smartphone, etc.) or another type of electronic device. The electronic device 100 includes at least one processor 110 coupled to a host bus 115. The processor 110 may be any of a variety of commercially available processors, such as an Intel ×86 processor, or another type of processor. A volatile memory 125, such as a Random Access Memory (RAM) or another type of volatile data store, is coupled to the processor 100, via a memory controller 120 and the host bus 115. When in operation, the memory 125 stores processor-executable instructions and data that are provided to the processor 110. An input/output (I/O) bus 155 is accessible to the host bust 120 via a bus controller 150.

A variety of additional components are coupled to the I/O bus 155. For example, a video display subsystem 160 is coupled to the I/O bus 155. The video display subsystem may include a display device 165 (e.g., a liquid crystal display (LCD) or other type of display screen) and hardware to drive the display device. At least one input device 170, such as a keyboard, a touch sensor, a touchpad, a mouse, etc., is also coupled to the I/O bus 155. A persistent storage device 175, such as a hard disk drive, a solid-state drive, or anther type of persistent data store, is further attached, and may persistently store computer-executable instructions and data, that are loaded into the volatile memory 130 when needed.

A panoramic camera 180 is also coupled to the I/O bus 155. As used herein the term "panoramic camera" refers to a video camera or video camera system that captures frames having a panoramic field of view. As used herein the term "panoramic field of view" refers to a field of view that equals or exceeds the field of view of the human eye (generally considered 70° by 160°). A panoramic field of view may encompass 360° along a given plane, for example along the horizontal plane. In one embodiment, the panoramic field of view is a spherical field of view and the panoramic camera is a spherical camera. As used herein the term "spherical camera" refers to a video camera or video camera system that captures frames having a spherical field of view. As user herein, the term "spherical field of view" refers a field of view that cover 60% or more of a full sphere. The panoramic camera 180 is configured to capture a view of the physical environment. The view of the physical environment captured by a panoramic camera 180 is referred to herein as a "panorama". A panorama may be embodied as a sequence of video frames.

A movement detector 185, for example, an orientation sensor or other sensor capable of determining when the panoramic camera 180 moves, is also coupled to the I/O bus 155. Still further, a network interface 190 is coupled to the I/O bus 155. The network interface enables communication over a computer network, such as the Internet, between the electronic device 100 and other devices (not shown), using any of a number of well known networking protocols. Such communication may enable collaborative, distributed, and remote computing, with functionality, including the functionality discussed below, being spread across multiple, potentially remote, electronic devices.

Working together, the components of the electronic device 100 (and other electronic devices in the case of collaborative, distributed, and/or remote computing) may execute a number of different software applications. For example, the memory 125 may store at least a portion of processor-executable instructions and data for an operating system (OS) 130 and an augmented reality application 140. The augmented reality application 140 may be logically divided into four processes: a capture process 142, an initialization process 144, a tracking process 146, and an augmentation process 148. The augmented reality application 140, in general, may operate to merge computer-generated elements with the panorama captured by the panoramic camera 180, based at least in part on the 3-D model, to create an augmented view. The augmented view may be shown to the user in a user interface of the augmented reality application 140, displayed on the display device 165.

Figure 2:
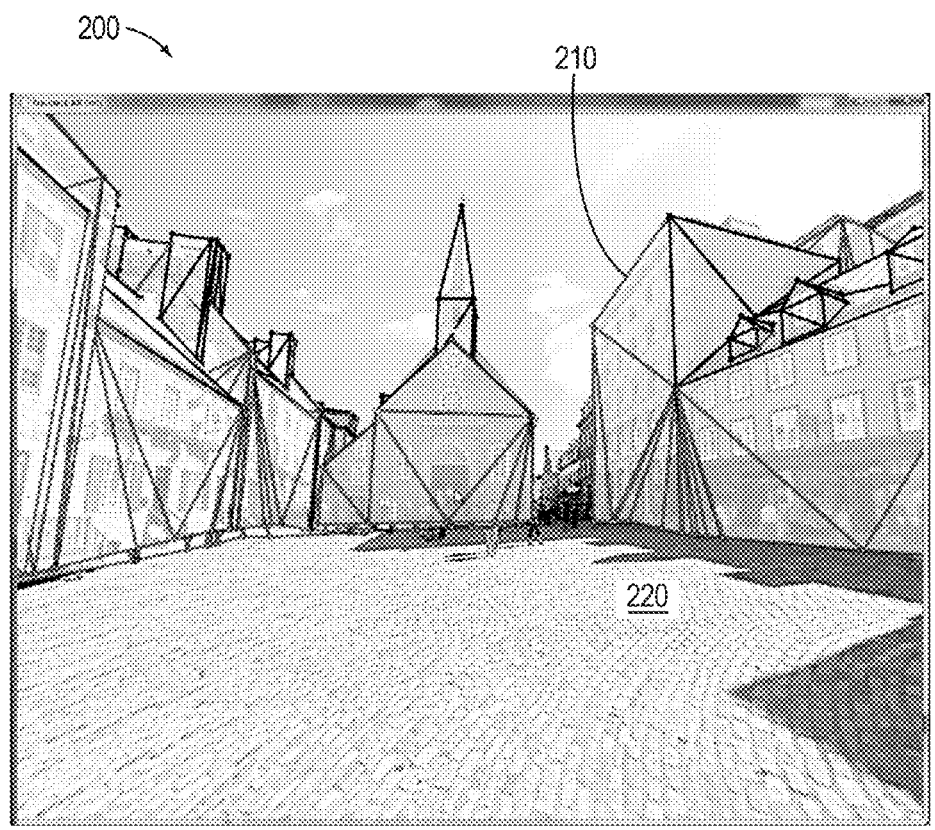
FIG. 2 is an example augmented view, or more specifically an augmented video frame, showing computer-generated elements merged with a sub-portion of a panorama.

FIG. 2 is an example augmented view, or more specifically an augmented video frame 200, showing computer-generated elements 210 merged with a sub-portion of a panorama 220. In this example, the panorama 220 depicts a city square, specifically the Place Royale in Quebec City. However any of a wide variety of different types of physical environments may be augmented. Further, in this example, the computer-generated elements 210 are elements of a 3-D model shown overlaid upon corresponding buildings. However, computer-generated elements 210 may be derived, at least in part, from another source, and may show different types of information unrelated to buildings.

An augmented view such as that shown in FIG. 2 may be achieved through interaction of the capture process 142, initialization process 144, tracking process 146, and augmentation process 148 of the augmented reality application 140. The capture process 142 captures the panorama utilizing the panoramic camera 180. The capture process 142 may operate continuously during an augmentation session to collect video frames as the panoramic camera 180 is potentially moved about the physical environment. In addition to capturing the video frames, the capture process 142 may also perform formatting and pre-processing operations upon the frames to prepare them for use by other processes of the augmentation application 140.

The initialization process 144 determines an initial pose of the panoramic camera 180. In one implementation, the initialization process 144 provides an initialization user-interface, which may be shown on the display device 165. Using the initialization user interface a user explicitly indicates correspondence between certain features in the panorama and certain features in a 3-D model of the physical environment ("manual" initialization). Alternatively, the initial pose may be determined "semi-manually" or fully "automatically".

Figure 3:
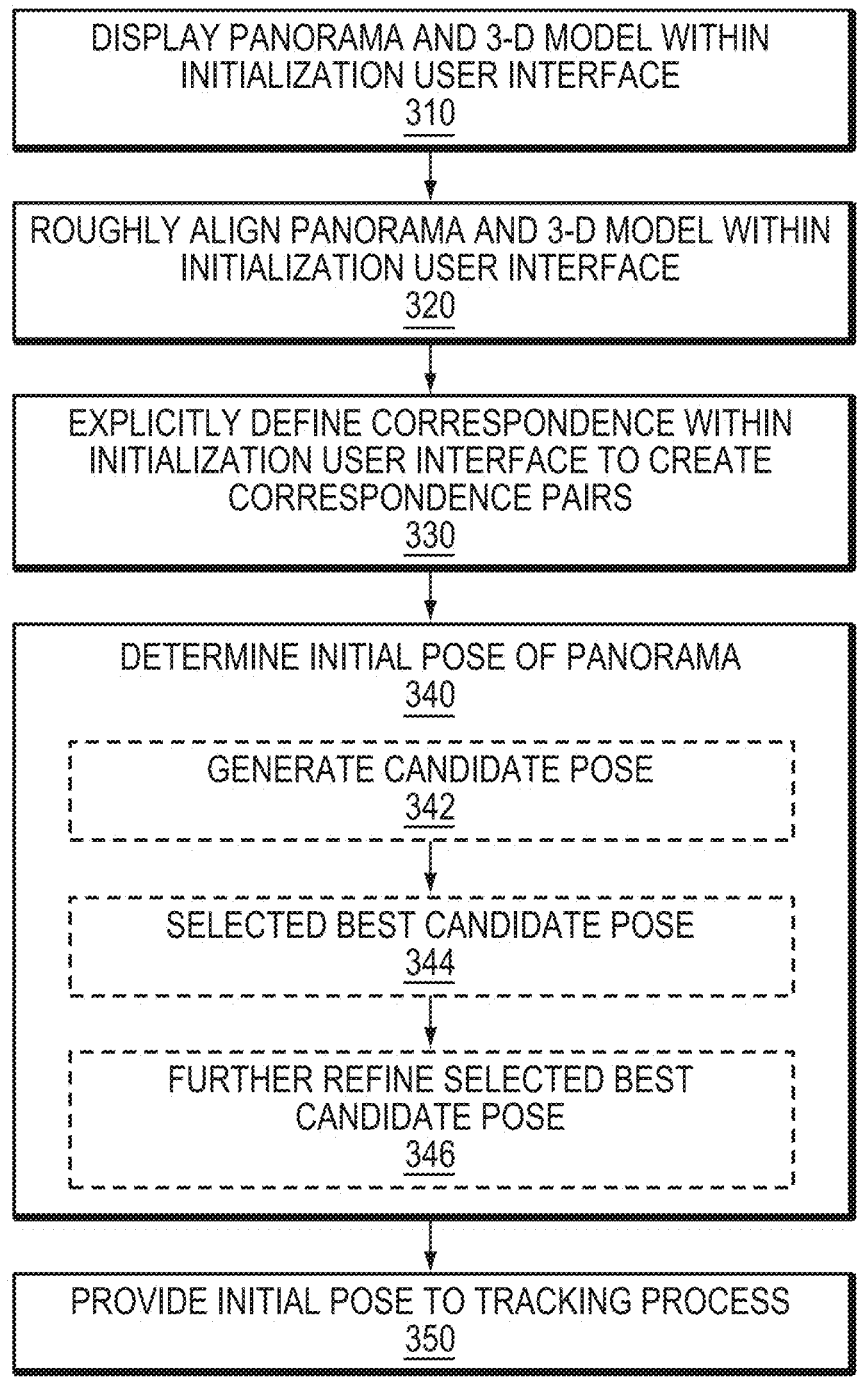
FIG. 3 is a flow diagram of an example "manual" initialization procedure that may be used by an initialization process to establish an initial pose of the panoramic camera.

FIG. 3 is a flow diagram of an example "manual" initialization procedure 300 that may be used by the initialization process 144 to establish an initial pose of the panoramic camera 180. At step 310, the initialization process 143 displays at least a portion of the panorama and a depiction of the 3-D model within an initialization user interface on the display device 165. At step 320, through an interactive process, a user roughly aligns the panorama and a depiction of the 3-D model in the initialization user interface, such that corresponding features in the two are proximate one another. At step 330, the user explicitly defines correspondence in the initialization user interface, by selecting corresponding features in the panorama and the 3-D model, to create a plurality of correspondence pairs. At step 340, a pose calculating algorithm of the initialization process 144 operates upon the plurality of user-selected correspondence pairs to determine an initial pose of the panoramic camera 180.

In one implementation, at sub-step 342, the pose calculation algorithm generates a plurality of candidate poses that are each based on a different subset (e.g., 3) of the plurality of correspondence pairs. At sub-step 344, a best candidate pose is selected from the plurality of candidate poses using a selection process, now considering all the plurality of candidate pairs, not just those of the subset used to generate the candidate pose. The selection process may comprise a random sample Consensus (RANSAC) algorithm, which employs overlap error as a quality criterion. At sub-step 346, the selected best candidate pose is further refined, for example, by application of a damped least-squares (DLS) algorithm (a Levenberg-Maruardt algorithm). The refined pose is then used as the initial pose. At step 350, the initial pose is provided by the initialization process 144 to the tracking process 146.

The tracking process 146 operates to update the pose of the panoramic camera from the initial pose to subsequent poses, to account for movement of the panoramic camera 180 about the physical environment. The tracking process 146 may operate continuously during an augmentation session, upon a plurality of features dispersed about the view of the physical environment shown in the panorama. By utilizing features dispersed about an extended field of view, a sufficient number of features for reliable tracking may be available, even in challenging conditions. Further, due to the ability to utilize feature spread in widely-separated orientations, the accuracy of tracking may be increased. The tracking process 146 may operate upon each sequential frame of the sequence of video frames captured by the panoramic camera 180. Alternatively, the tracking process may operate upon a subset of the video frames, tracking periodically and/or in response to detected movement. For example, if the panoramic camera 180 is immobilized (e.g., placed on a tripod), the movement detector 185 may detect a lack of movement, and the tracking process 146 may be triggered to pause tracking. The tracking process 146 may be triggered to reactivate tracking in response to the movement detector 185 detecting later movement (e.g., the panoramic camera 180 being removed from the tripod and moved about or the entire panoramic camera and tripod setup being moved together to another location).

In some cases, rather than employ a separate movement detector 185, a lack of movement may be detected by tracking features in video frames captured by the panoramic camera 180. A camera movement feature tracker may monitor the frames and, based on the movement of features in a manner consistent with camera movement, may trigger a camera movement event. A lack of camera movement events may cause the tracking process 146 to pause tracking for augmented reality purposes. The camera movement feature tracker may continue to track features, however, for camera movement determination.

Figure 4:
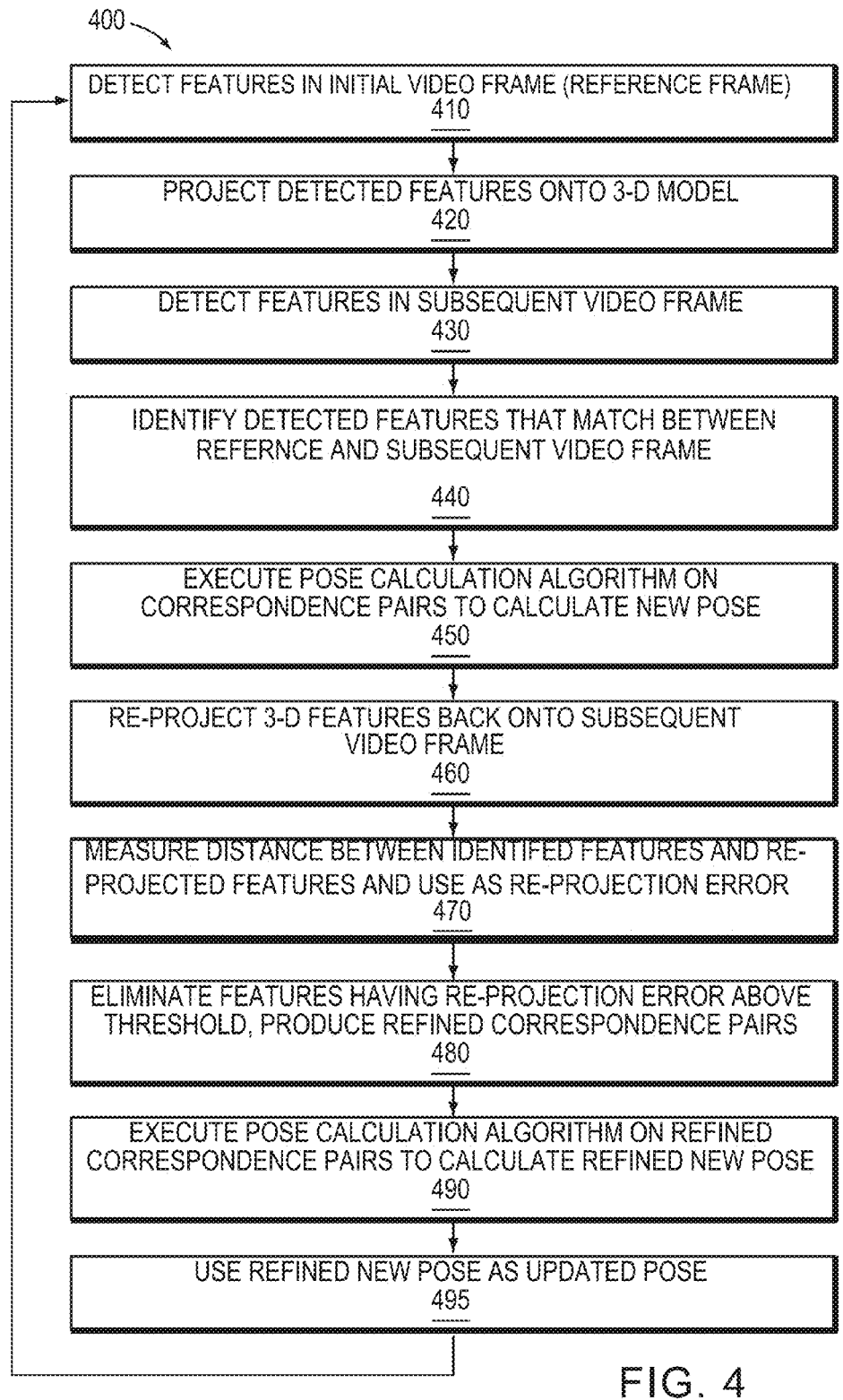
FIG. 4 is a flow diagram of an example tracking procedure that may be performed by the tracking process.

FIG. 4 is a flow diagram of an example tracking procedure 400 that may be performed by the tracking process 146. At step 410, the tracking process 146 detects features (e.g., lines, corners, or other salient details) in an initial video frame (e.g., Frame 0) of sequence of frames (e.g., Frame 0, Frame 1, Frame 2, etc.) from the panoramic camera 180, using a feature detector. The initial video frame (e.g., Frame 0) is considered the "reference frame". The feature detector may be a performant scale and rotation invariant feature detector, such as the Speeded Up Robust Features (SURF) feature detector, or another type of feature detector. Features within any portion of the extended field of view encompassed in the reference frame (e.g., Frame 0) may be detected. At step 420, the detected features in the reference frame (e.g., Frame 0) are projected onto the 3-D model. The projection identifies corresponding features in the 3-D model where overlap occurs and results in assigning a 3-D position to each feature detected in the panoramic image frame that overlaps with the 3-D model. At step 430, the tracking process 146 detects features in a subsequent video frame (e.g., Frame 1) from the panoramic camera 180, using the feature detector. At step 440, the tracking process 146 identifies those detected features that match between (i.e., are common between) the reference frame (e.g., Frame 0) and the subsequent video frame (e.g., Frame 1). The result is a set of features in the subsequent video frame and their correspondence in the reference frame, for which the 3-D location is known through projection onto the 3-D model. At step 450, a pose calculation algorithm (for example, the same pose calculation algorithm used by the initialization process 144 discussed above) is executed upon the established correspondence pairs, to calculate a new pose of the panoramic camera 180. The new pose may then be refined.

For example, once the pose is obtained at step 450, the tracking process 146 will, at step 460, re-project each 3-D feature position back onto the subsequent video frame (e.g., Frame 1) using the camera pose obtained at step 450. The distance between each feature identified at step 430 and their corresponding re-projected feature obtained at step 460 is then measured at step 470 and used as a re-projection error. At step 480, the features in the subsequent video frame (e.g., Frame 1) having a re-projection error that exceeds a certain threshold (e.g., 5%) are eliminated, to yield a set of remaining features. The set of remaining features in the subsequent video frame (e.g., Frame 1) are used in refined correspondence pairs. At step 490, the pose calculation algorithm is utilized upon the refined correspondence pairs, to calculate a refined new pose of the panoramic camera. At step 495, the refined new pose is then used as the updated pose of the panoramic camera, and the updated pose is provided by the tracking process 146 to the augmentation process 148. Execution may then loop back to step 410, such that the tracking process 146 repeats these steps upon a successive initial frame (e.g., now using Frame 1 as the reference frame) and a successive subsequent frame (e.g., now using Frame 2 as the subsequent frame), and so forth, to track the panoramic camera 180 as it potentially moves about the physical environment.

However, changing the reference frame each time execution loops back to step 410 may cause an accumulation of error that decreases the accuracy of the pose yielded after many iterations of the tracking procedure 400. In an alternative embodiment, in efforts to improve pose accuracy, the reference frame may be maintained through successive iterations, and, for example, updated less frequently, in response to a trigger. In such an alternative embodiment, when execution loops back to step 410, the reference frame may be maintained (e.g., still as Frame 0) while the subsequent video frame it is compared to advances (e.g., becomes Frame 2, and on the next iteration becomes Frame 3, etc). The trigger may be a periodic trigger. For example, a counter may be employed that causes the reference frame to be updated after a certain number of frames have been processed. Alternatively, the trigger may be a dynamic trigger. For example, a number of correspondences between the subsequent frame and the reference frame may be compared to a threshold, and when this quantity falls below the threshold, the reference frame is updated. A variety of other alternatives may be used.

The augmentation process 148 operates to merge computer-generated elements with the panorama based on the updated pose of the panoramic camera 180. As mentioned above, the computer generated features may be derived from the 3-D model or be derived, at least in part, from another source. At least a sub-portion of the panorama, along with computer-generated elements, is shown to the user as an augmented view on the display device 165. The augmented view may have a field of view less than the panorama, for example, a field of akin to that captured by a "standard" camera to facilitate display on the display device 165.

While the above description discusses various embodiments of the present disclosure, it should be apparent that a number of modifications and/or additions may be made without departing from the disclosure's intended spirit and scope. For example, while it is discussed above that the panoramic camera 180, the augmented reality application 140 and the display device 165, may all be part of the same electronic device 100, it should be remembered that, these components may be distributed among two or more electronic devices. For example, the camera 180 may be coupled to a first electronic device (e.g., a tablet computer) used to capture views of the physical environment, while at least portions of the augmented reality application 140 may be resident on a second electronic device (e.g., a server) used generate an augmented view. The display device 165 that shows an augmented view may be a portion of the first electronic device, the second electronic device, or yet another electronic device. Accordingly, it should be remembered that the above techniques may be applicable to a variety of different configurations.

Furthermore, while the capture process 142, initialization process 144, tracking process 146, and augmentation process 148 of the augmented reality application 140 may be software applications as discussed above, it should be remembered that, some or all of these processes, may be implemented in hardware. In general, many of the techniques discussed herein may be implemented in software, in hardware, or a combination thereof. A software implementation may include processor-executable instructions that implement applications stored in a non-transitory computer-readable medium, such as a volatile or persistent memory device, a hard-disk, a compact disk (CD), etc. A hardware implementation may include processors, memory chips, programmable logic circuits, application specific integrated circuits, and/or other types of hardware components. Further, a combined software/hardware implementation may include both computer-executable instructions stored in a non-transitory computer-readable medium, as well as hardware components. Accordingly, it should be understood that the above descriptions are meant to be taken only by way of example.

What is claimed is:

1. An apparatus for providing an augmented view of a physical environment comprising:
    a panoramic camera;
    a processor; and
    a memory coupled to the processor and configured to store instructions for an augmented reality application, the augmented reality application including:
        a capture process that when executed is operable to capture a panorama of the physical environment using the panoramic camera, the panorama having a panoramic field of view and being embodied as a sequence of video frames,
        an initialization process that when executed is operable to determine an initial pose of the panoramic camera,
        a tracking process that when executed is operable to track the panoramic camera to update the initial pose to subsequent poses to account for movement of the panoramic camera about the physical environment, the tracking process to utilize features dispersed across the panoramic field of view of the video frames, and
        an augmentation process that when executed is operable to augment the panorama by merging computer-generated elements with the panorama based on the updated pose of the panoramic camera, and to display a sub-portion of the panorama, along with the computer-generated elements, as an augmented view, the displayed augmented view having a field of view that is less than the panoramic field of view.

2. The apparatus of claim 1, wherein the tracking process when executed is operable to:
    detects features in an initial video frame,
    detect features in a subsequent video frame,
    determine features in the subsequent video frame that match features in the initial video frame, and
    calculate an updated pose of the panoramic camera, at least in part, utilizing the matched features.

3. The apparatus of claim 2, wherein the tracking process when executed is operable to:
    project detected features in the initial video frame onto a three-dimensional (3-D) model of the physical environment to identify features in the 3-D model,
    use the matched features in the subsequent video frame and the features in the 3-D model to establish correspondence pairs, and execute a pose calculation algorithm upon the correspondence pairs.

4. The apparatus of claim 3, wherein the pose calculation algorithm yields a new pose for the panoramic camera, and the tracking process when executed is further operable to:
refine the new pose by elimination of features having a re-projection error that exceeds a certain threshold to produce a refined new pose that is used as the updated pose of the physical camera.

5. The apparatus of claim 1, wherein the initialization process when executed is further operable to:
provide an initialization user-interface via which a user explicitly indicates correspondence between features in the panorama and features in a three dimensional (3-D) model of the physical environment, to establish correspondence pairs, and
execute a pose calculation algorithm upon the correspondence pairs.

6. The apparatus of claim 1, wherein the apparatus further comprises a movement detector, and the tracking process is responsive to movement detected by the movement detector to pause tracking in response to a lack of movement, and to reactivate tracking in response to movement.

7. The apparatus of claim 1, wherein the computer-generated elements are derived from elements of a three-dimensional (3-D) model of the physical environment.

8. The apparatus of claim 1, wherein the panoramic camera is a spherical camera and the panoramic field of view is a spherical field of view.

9. A method of providing an augmented view of a physical environment comprising:
capturing a panorama of the physical environment with a panoramic camera, the panorama having a panoramic field of view and being embodied as a sequence of video frames;
determining an initial pose of the panoramic camera;
tracking the panoramic camera to update the initial pose to subsequent poses to account for movement of the panoramic camera about the physical environment, the tracking to utilize features dispersed across the panoramic field of view of the video frames; and
augmenting the panorama, the augmenting to merge computer-generated elements with the panorama based on the updated pose of the panoramic camera, and display on a display device a sub-portion of the panorama, along with the computer-generated elements, as an augmented view, the displayed augmented view having a field of view that is less than the panoramic field of view.

10. The method of claim 9, wherein the tracking further comprises:
detecting features in an initial video frame of the sequence of frames;
detecting features in a subsequent video frame of the sequence of frames;
determining features in the subsequent video frame that match features in the initial video frame; and
calculating an updated pose of the panoramic camera, at least in part, utilizing the matched features and a three dimensional (3-D) model of the physical environment.

11. The method of claim 10, wherein the tracking further comprises:
projecting detected features in the initial video frame onto a three-dimensional (3-D) model of the physical environment to identify features in the 3-D model;
using the matched features in the subsequent video frame and the features in the 3-D model to establish correspondence pairs; and
executing a pose calculation algorithm upon the correspondence pairs.

12. The method of claim 11, wherein the pose calculation algorithm yields a new pose for the panoramic camera, and the tracking further comprises:
refining the new pose by elimination of features having a re-projection error that exceeds a certain threshold, to produce a refined new pose that is used as the updated pose of the physical camera.

13. The method of claim 9, wherein the determining an initial pose comprises:
providing an initialization user-interface via which a user explicitly indicates correspondence between features in the panorama and features in a three dimensional (3-D) model of the physical environment, to establish correspondence pairs; and
executing a pose calculation algorithm upon the correspondence pairs.

14. The method of claim 9, wherein the tracking is responsive to movement detected by a movement detector, to pause tracking in response to a lack of movement and to reactivate tracking in response to movement.

15. The method of claim 9, wherein the computer-generated elements are derived from elements of a three-dimensional (3-D) model of the physical environment.

16. The method of claim 9, wherein the panoramic camera is a spherical camera and the panoramic field of view is a spherical field of view.

17. A non-transitory computer-readable medium that includes instructions executable on a processor, the instructions, when executed, operable to:
capture a panorama of a physical environment using a panoramic camera, the panorama having a panoramic field of view and being embodied as a sequence of video frames;
determine an initial pose of the panoramic camera;
track the panoramic camera to update the initial pose to subsequent poses to account for movement of the panoramic camera about the physical environment, by utilizing features dispersed across the panoramic field of view of the video frames; and
augment the panorama by merging computer-generated elements with the panorama based on the updated pose of the panoramic camera to create an augmented view, and displaying the augmented view on a display device.

18. The non-transitory computer-readable medium of claim 17, wherein the instructions to track, when executed, are further operable to:
detect features in an initial video frame of the sequence of frames;
identify features in a subsequent video frame of the sequence of frames;
determine features in the subsequent video frame that match features in the initial video frame; and
calculate an updated pose of the panoramic camera, at least in part, utilizing the matched features and the three dimensional (3-D) model of the physical environment.

19. The non-transitory computer-readable medium of claim 17, wherein the computer-generated elements are derived from elements of a three-dimensional (3-D) model of the physical environment.

20. The non-transitory computer-readable medium of claim 17, wherein the panoramic camera is a spherical camera and the panoramic field of view is a spherical field of view.

* * * * *